(12) United States Patent
Ueno

(10) Patent No.: US 8,167,503 B2
(45) Date of Patent: May 1, 2012

(54) TAPER ROLLER BEARING

(75) Inventor: Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 223 days.

(21) Appl. No.: 12/663,042

(22) PCT Filed: Jun. 3, 2008

(86) PCT No.: PCT/JP2008/060203
§ 371 (c)(1),
(2), (4) Date: Dec. 4, 2009

(87) PCT Pub. No.: WO2008/149854
PCT Pub. Date: Dec. 11, 2008

(65) Prior Publication Data
US 2010/0183257 A1 Jul. 22, 2010

(30) Foreign Application Priority Data
Jun. 8, 2007 (JP) ................................. 2007-152789

(51) Int. Cl.
F16C 33/56 (2006.01)
F16C 43/08 (2006.01)
F16C 33/54 (2006.01)

(52) U.S. Cl. ......... 384/576; 384/539; 384/572; 384/575

(58) Field of Classification Search .................. 384/523, 384/527, 548, 560, 564, 565, 571–572, 575–576, 384/582, 539; 29/898.041, 898.067
See application file for complete search history.

(56) References Cited

U.S. PATENT DOCUMENTS

| | | | |
|---|---|---|---|
| 2,435,839 A * | 2/1948 | McNicoll | 384/575 |
| 3,694,043 A * | 9/1972 | Tellson | 384/578 |
| 3,720,450 A * | 3/1973 | Dominik | 384/572 |
| 3,940,193 A | 2/1976 | Molloy | |
| 4,136,916 A * | 1/1979 | Musselman et al. | 384/576 |
| 4,523,862 A * | 6/1985 | Yasui et al. | 384/564 |
| 4,601,592 A * | 7/1986 | Jatczak et al. | 384/564 |

(Continued)

FOREIGN PATENT DOCUMENTS

DE 4338350 A1 * 5/1995

(Continued)

OTHER PUBLICATIONS

International Search Report issued Aug. 12, 2008 in International (PCT) Application No. PCT/JP2008/060203.

(Continued)

*Primary Examiner* — Marcus Charles
(74) *Attorney, Agent, or Firm* — Wenderoth, Lind & Ponack, L.L.P.

(57) ABSTRACT

A taper roller bearing includes an inner race, an outer race, taper rollers arranged so as to be rollable between the inner and outer races, and a retainer for retaining the taper rollers, in which a flange portion is provided only on the radially larger side of the inner race. The retainer includes a radially-larger-side annular portion including a hook portion. The hook portion effects hooking so that the flange portion of the inner race is maintained in an assembled state. In a neutral state, the hook portion is kept out of contact with the flange portion. A guide surface portion for guiding the inner race to be incorporated is provided on a radially inner end portion of an outer surface of the hook portion.

17 Claims, 10 Drawing Sheets

U.S. PATENT DOCUMENTS

| | | | |
|---|---|---|---|
| 5,630,668 A * | 5/1997 | Ikezawa et al. | 384/527 |
| 5,921,685 A * | 7/1999 | Ishimaru et al. | 384/564 |
| 7,101,088 B2 * | 9/2006 | Yamamoto et al. | 384/470 |
| 7,220,059 B2 * | 5/2007 | Gobel et al. | 384/551 |
| 2006/0002646 A1 * | 1/2006 | Tsujimoto | 384/571 |
| 2006/0002647 A1 * | 1/2006 | Tsujimoto | 384/571 |
| 2008/0193070 A1 * | 8/2008 | Beluffi et al. | 384/523 |
| 2009/0003745 A1 | 1/2009 | Tsujimoto | |

FOREIGN PATENT DOCUMENTS

| | | |
|---|---|---|
| EP | 1 746 298 | 1/2007 |
| JP | 58-165324 | 11/1983 |
| JP | 52129761 A * | 10/1997 |
| JP | 2001-140900 | 5/2001 |
| JP | 2002054638 A * | 2/2002 |
| JP | 2005016656 A * | 1/2005 |
| JP | 2006-022824 | 1/2006 |
| JP | 2006070984 A * | 3/2006 |
| JP | 2006242262 A * | 9/2006 |
| JP | 2007-132469 | 5/2007 |

OTHER PUBLICATIONS

International Preliminary Report on Patentability and Written Opinion of the International Searching Authority mailed Dec. 23, 2009 in International (PCT) Application No. PCT/JP2008/060203.

Supplementary European Search Report issued Aug. 23, 2011 in corresponding European Patent Application No. 08765016.4.

* cited by examiner

TAPER ROLLER BEARING

TECHNICAL FIELD

The present invention relates to a taper roller bearing.

BACKGROUND ART

Driving force of an automobile engine is transmitted to wheels through an intermediation of a power transmission system including any or all of a transmission, a propeller shaft, a differential, and a drive shaft.

In the power transmission system, there is used in many cases, as a bearing for supporting a shaft, a taper roller bearing excellent in load capability with respect to radial load and axial load, impact resistance, and bearing rigidity. As illustrated in FIG. 8, the taper roller bearing generally includes an inner race 2 having a tapered raceway surface 1 on an outer peripheral side thereof, an outer race 4 having a tapered raceway surface 3 on an inner peripheral side thereof, a plurality of taper rollers 5 arranged so as to be rollable between the inner race 2 and the outer race 4, and a retainer 6 for retaining the taper rollers 5 at predetermined circumferential intervals.

As illustrated in FIG. 9, the retainer 6 includes a pair of annular portions 6a and 6b and brace portions 6c for coupling the annular portions 6a and 6b with each other. The taper rollers 5 are accommodated in pockets 6d formed between the brace portions 6c adjacent to each other in a circumferential direction.

In the taper roller bearing, the taper rollers 5 and the respective raceway surfaces 1 and 3 of the inner race 2 and the outer race 4 are held in linear contact with each other, and the taper roller bearing is designed such that the respective raceway surfaces 1 and 3 of the inner and outer races and a roller center O accord with one point (not shown) on an axial center P (refer to FIG. 8).

Thus, the taper rollers 5 are pressed to a radially larger side when load acts thereon. In order to bear the load, a flange portion 7 protruding to a radially outer side is provided on a radially larger side of the inner race 2. Further, in order to prevent the taper rollers 5 from falling to a smaller end side until completion of the incorporation of the bearing into a machine or the like, there is provided a flange portion 8 protruding also to the smaller end side of the inner race 2.

In recent years, in accordance with an increase in in-vehicle space, progress has been made in reduction in size of an engine room, increased output of an engine, and a multi-stage transmission for less fuel consumption. Under the circumstances, the environment in which taper roller bearings are used becomes more severe each year. In order to meet the demand for life of the transmission under the use environment, it is necessary to achieve longer life of the bearing.

Under the above-mentioned circumstances, there has been proposed, to achieve longer life of the bearing, increasing the number of rollers or by increasing the length of the rollers so as to increase load capacity within the same dimension as that of the currently-used bearing. However, in the currently-used structure as described above, in terms of assembly of the bearing, the flange portion (small flange) 8 is provided on the radially smaller side of the raceway surface of the inner race 2. Meanwhile, the flange portion 8 imposes a restriction on an increase in the length dimension of the taper rollers 5. Further, the taper rollers 5 are retained by the retainer 6 as described above, and the brace portions 6c of the retainer 6 are interposed between the taper rollers 5 adjacent to each other in the circumferential direction. Thus, the brace portions 6c impose a restriction also on increasing the number of rollers. As described above, there has been conventionally a limitation on an increase in the load capacity.

Incidentally, in some conventional taper roller bearings, a flange portion (small flange) on a radially smaller side is omitted in an inner race (Patent Document 1). When the flange portion on the radially smaller side is omitted in the inner race, it is possible to secure a longer axial length of the taper rollers correspondingly to a size of the flange portion thus omitted, and hence possible to achieve an increase in the load capacity. However, when the flange portion on the radially smaller side is omitted in the inner race, the taper rollers 5 fall to the smaller end side before completion of the incorporation into a machine or the like. As a countermeasure, as illustrated in FIG. 6, in the bearing in which the flange portion (small flange) on the radially smaller side is omitted in the inner race, hook portions to be engaged with the flange portion 31 on the radially larger side are provided in the retainer so that the taper rollers do not fall off.

That is, the taper roller bearing illustrated in FIG. 6 is a double-row taper roller bearing, and includes a pair of inner races 21, an outer race 22, a plurality of taper rollers 23 arranged so as to be rollable between the pair of inner races 21 and the outer race 22, and a pair of retainers 24 for retaining the taper rollers 23 at predetermined circumferential intervals.

Similarly to the retainer 6 illustrated in FIG. 9, each of the retainers 24 includes a radially-larger-side annular portion 25, a radially-smaller-side annular portion 26, and brace portions 27 for coupling the radially-larger-side annular portion 25 and the radially-smaller-side annular portion 26 with each other. Pockets 28 are formed between the brace portions 27 adjacent to each other in a circumferential direction, and the taper rollers 23 are retained in the pockets 28, respectively.

In the radially-larger-side annular portion 25, there are formed hook portions 30 arranged at predetermined pitches in the circumferential direction. In this case, each of the hook portions 30 is constituted by a flat rectangular piece protruding from the outer peripheral end portion of the radially-larger-side annular portion 25 to the radially inner direction. Further, as illustrated in FIG. 7, in a flange portion 31 of each of the inner races 21, a cutout portion 32 is formed on a radially larger side of a radially outer surface 31a of the flange portion 31 of each of the inner races 21, and each of the hook portions 30 is engaged with the cutout portion 32. In this case, between the hook portions 30 and the cutout portions 32, there are slight gaps in an axial direction and a radial direction, which allow the retainers 24 to slightly move in the axial direction and the radial direction. In this context, the hook portions 30 are kept out of contact with the flange portion 31 when the retainers 24 in a neutral state with respect to the axial center during operation (in a bearing-assembled state) are kept out of contact with the same flange portion 31, and the hook portions 30 are brought into contact with the flange portion 31 while a bottom surface 31c of the flange portion 31 of each of the inner races 21 and an inner surface (radially inner end) 33b of each of the hook portions 30 are brought into contact with each other. The hook portions 30 effect hooking so that the inner races 21, the taper rollers 23, and the retainers 24 are maintained in the assembled state except during operation.

Patent Document 1: Japanese Utility Model Application Laid-open No. Sho 58-165324

BRIEF SUMMARY OF THE INVENTION

Problem to be solved by the Invention

Incidentally, in order to assemble the taper roller bearing as illustrated in FIG. 6, first, the taper rollers 23 are accommodated in the pockets 28 of the retainers 24, respectively. After that, the inner races 21 are fitted to an inside of an assembly thus obtained of the retainers 24 and the taper rollers 23. In other words, the assembly of the retainers 24 and the taper rollers 23 is fitted to an outside of the inner races 21.

Then, a pair of assemblies each including one of the inner races 21, the taper rollers 23, and one of the retainers 24 are formed, and the assemblies are inserted from both opening portions onto the outer race 22, respectively. In this manner, it is possible to assemble the taper roller bearing constituted by the inner races 21, the taper rollers 23, the retainers 24, and the outer race 22 integrated with each other.

However, it is necessary to fit the hook portions 30 to the cutout portion 32 of each of the inner races 21. In this case, the hook portions 30 are fitted thereto by being elastically deformed. That is, when the hook portions 30 are fitted to the cutout portion 32 of each of the inner races 21, a radially inner end portion 33a of an outer surface 33 of each of the hook portions 30 is brought into contact with an inner surface 31b of the flange portion 31 of each of the inner races 21. However, the radially inner end portion 33a of the outer surface 33 of each of the hook portions 30 is formed as a flat surface. Accordingly, at the time of the incorporation of the inner races 21, each of the inner races 21 butts against the radially inner end portion 33a of the outer surface 33 of each of the hook portions 30, and hence it is extremely difficult to incorporate. Thus, excessive external force acts on the hook portions 30, and the hook portions 30 may be damaged.

In view of the above-mentioned problem, the present invention has been made to provide a taper roller bearing which is excellent in incorporating properties and has longer axial length of the rollers so as to increase load rating.

Means for Solving the Problem

A taper roller bearing according to the present invention includes: an inner race; an outer race; a plurality of taper rollers arranged so as to be rollable between the inner race and the outer race; a retainer for retaining the taper rollers at predetermined circumferential intervals; and a flange portion provided only on a radially larger side of a radially outer surface of the inner race, for guiding the taper rollers, in which the retainer includes: a radially-larger-side annular portion; a radially-smaller-side annular portion; and a brace portion for coupling the radially-larger-side annular portion and the radially-smaller-side annular portion with each other, the radially-larger-side annular portion being provided with a hook portion capable of being hooked, the hook portion having an outer surface at a radially inner end portion of which a guide surface portion for guiding the inner race to be incorporated is formed.

According to the taper roller bearing of the present invention, the raceway surface of the inner race is formed from the flange portion to a radially smaller end, and the flange portion and a grooved portion on the radially smaller side of the inner race, which exist in the conventional taper roller bearings, are omitted. Thus, it is possible to secure a larger raceway surface correspondingly to sizes of the flange portion and the grooved portion thus omitted. Further, the engagement portion to be engaged with the flange portion of the inner race is provided to the retainer, and hence the taper rollers are prevented from falling to a smaller end side.

Specifically, the guide surface portion for guiding the inner race to be incorporated is provided at the radially inner end portion of the outer surface of the hook portion. Thus, the inner race can be incorporated while being guided along the guide surface portion.

During operation, the hook portion is kept out of or brought into contact with the flange portion of the inner race. When being brought into contact therewith, the hook portion effects hooking so that an inner surface of the hook portion and a bottom surface of a cutout portion of the flange portion of the inner race are brought into contact with each other. Further, the hook portion effects hooking so that the inner race, the taper rollers, and the retainer are maintained in an assembled state except during operation. With this, the hook portion does not hinder rotation during operation, and the taper rollers are prevented from falling to a smaller end side prior to the incorporation or the like.

The guide surface portion may constitute a taper surface reduced in diameter to an axially inner side, and the retainer may be made of metal or a resin.

When the retainer is made of a resin, the resin is preferably a polyphenylene sulfide resin (PPS). PPS is a high-performance engineering plastic having a molecular structure in which a phenyl group (benzene ring) and sulfur (S) are alternately repeated. PPS is crystalline and is excellent in heat resistance, for example, has a continuous use temperature of 200° C. to 220° C. and has a deflection temperature under load in a high load (1.82 MPa) condition of 260° C. or higher. In addition, PPS has high tensile strength and flexural strength. PPS has a mold shrinkage factor as small as 0.3 to 0.5%, and hence has good dimensional stability. PPS is also excellent in flame retardance and chemical resistance. PPS is broadly classified into three types: a crosslinked type; a linear type; and a semi-crosslinked type. The crosslinked type is a high molecular weight product obtained by crosslinking a low molecular weight polymer and is brittle, and thus, the main grade is a grade reinforced with a glass fiber. The linear type is a high molecular weight product obtained without any cross-linking process at a polymerization stage, and has high toughness. The semi-crosslinked type is characterized by having both properties of the crosslinked type and the linear type.

A roller coefficient $\gamma$ may be set to exceed 0.94, and an aperture angle formed in a pocket of the retainer may be set to 55° or larger and 80° or smaller. In this case, the roller coefficient $\gamma$ is defined by the following formula. Further, the aperture angle of the pocket (formed between the brace portions adjacent to each other in the circumferential direction) represents an angle formed between surfaces of the brace portions, which are brought into contact with a rolling surface of each of the taper rollers.

Roller coefficient $\gamma = (Z \cdot DA)/(\pi \cdot PCD)$ where Z is the number of rollers, DA is an average diameter of rollers, and PCD is a pitch circle diameter of rollers.

It is preferred that the taper roller bearing of the present invention be used for supporting a power transmission shaft of an automotive vehicle.

Effects of the Invention

In the taper roller bearing of the present invention, the flange portion on the radially smaller side of the inner race, which exists in the conventional taper roller bearings, is omitted. Thus, it is possible to achieve weight reduction correspondingly to weight of the flange portion thus omitted. In addition, a size of the raceway surface is increased correspondingly to the sizes of the flange portion and the grooved portion on the radially smaller side thus omitted. With this, it is possible to increase the length of the axial center of the taper rollers, and hence to increase the load capacity thereof. As a result, it is possible to achieve longer life of the taper roller bearing.

The hook portions stably prevent the rollers from being detached from the inner races. With this, it is possible to enhance incorporating properties. Specifically, each of the inner races can be incorporated while being guided along the guide surface portion, and hence excessive external force is prevented from acting on the hook portions at the time of the incorporation. Thus, it is possible to prevent occurrences of damage to the hook portions and plastic deformation exceeding the elastic limit, and hence possible to stably perform the function of the hook portions. Further, the hook portions do not hinder rotation during operation, and hence it is possible to effect smooth rotation.

The guide surface portion may constitute the taper surface reduced in diameter to the axially inner side. With this, it is possible to stably form the guide surface portion, and possible to increase reliability in incorporation into the inner races.

When the retainers are made of iron plate, it is possible to increase rigidity of the retainers so as to stably retain the taper rollers over a long period of time. In addition, the retainers are excellent in oil resistance so that material deterioration caused by exposure to oil is prevented.

Further, in comparison with ones made of iron plate, the retainers made of a resin have lighterweight, self-lubricancy, and lower frictional coefficient. Thus, synergistically with the effect of a lubricating oil existing in the bearing, it is possible to suppress generation of abrasion due to contact with the outer race. Further, the retainers made of a resin are lighterweight and have lower frictional coefficient, and hence is suitable for suppressing torque loss and abrasion of the retainers at the time of activating the bearing. In this context, adoption of a polyphenylene sulfide resin (PPS) exhibiting high resistance against oil, high temperature, and chemicals to the retainer leads to significant elongation of the life of the retainer.

When the roller coefficient $\gamma$ is set to exceed 0.94, it is possible to increase the width of the brace of the retainer while the outer race and the retainer are kept out of contact with each other in the neutral state. Thus, without changing the bearing dimension, it is possible to increase the load capacity to the same level as that of a full complement roller bearing (bearing without retainer). With this, it is possible to reduce contact surface pressure, to lessen the surface pressure in a halt state, and to enhance fretting resistance. In addition, an excellent contact state can be secured between the retainer and the taper rollers, and hence the rollers can be smoothly rolled.

Further, setting of the aperture angle of the retainer to be 55° or larger allows an excellent contact state to be secured with respect to the taper rollers. Setting of the aperture angle of the retainer to be 80° or smaller prevents an increase in pressing force in a radial direction, and hence the rollers can be smoothly rolled.

Thus, the taper roller bearing of the present invention is optimum as a bearing for supporting a power transmission shaft of an automotive vehicle.

DETAILED DESCRIPTION OF THE INVENTION

In the following, an embodiment of the present invention is described with reference to FIGS. 1 to 5.

Figure 1:
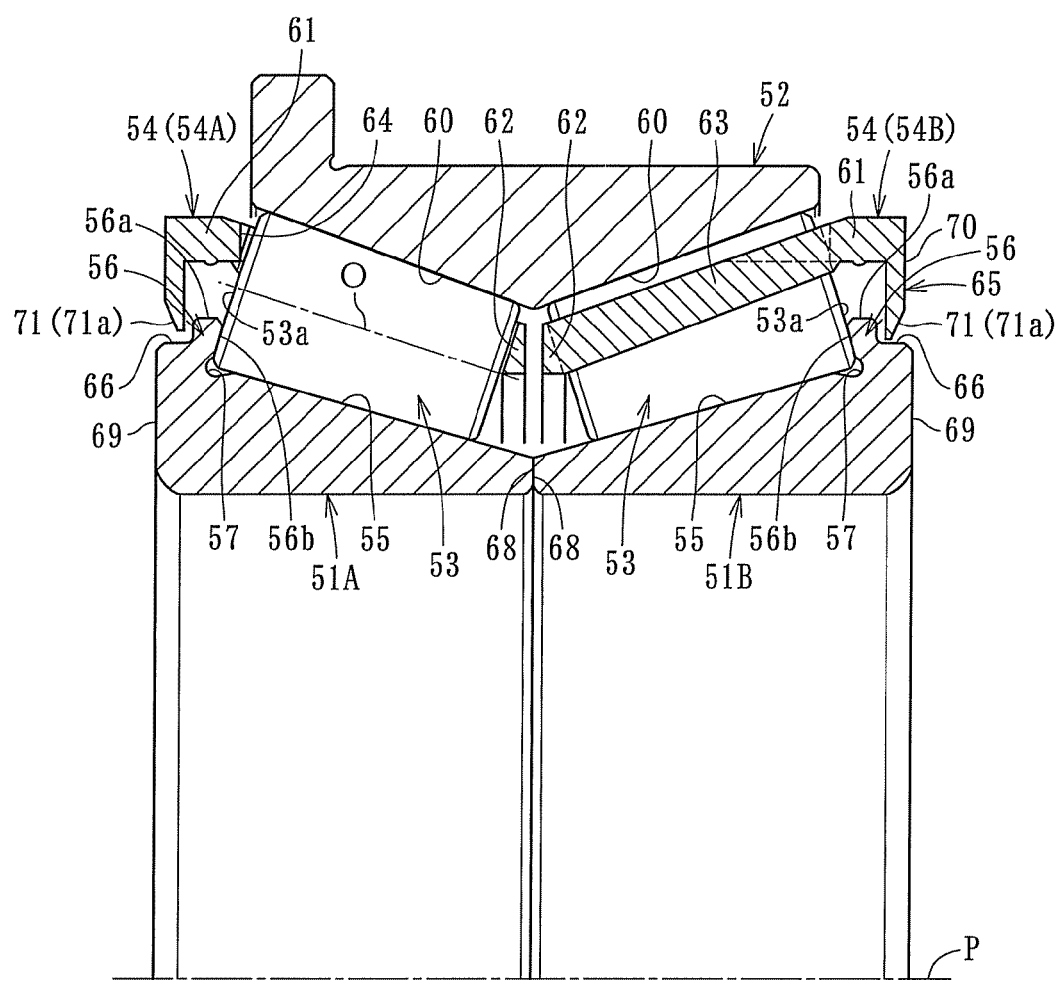
FIG. 1 is a sectional view of a taper roller bearing according to an embodiment of the present invention.
Figure 2:
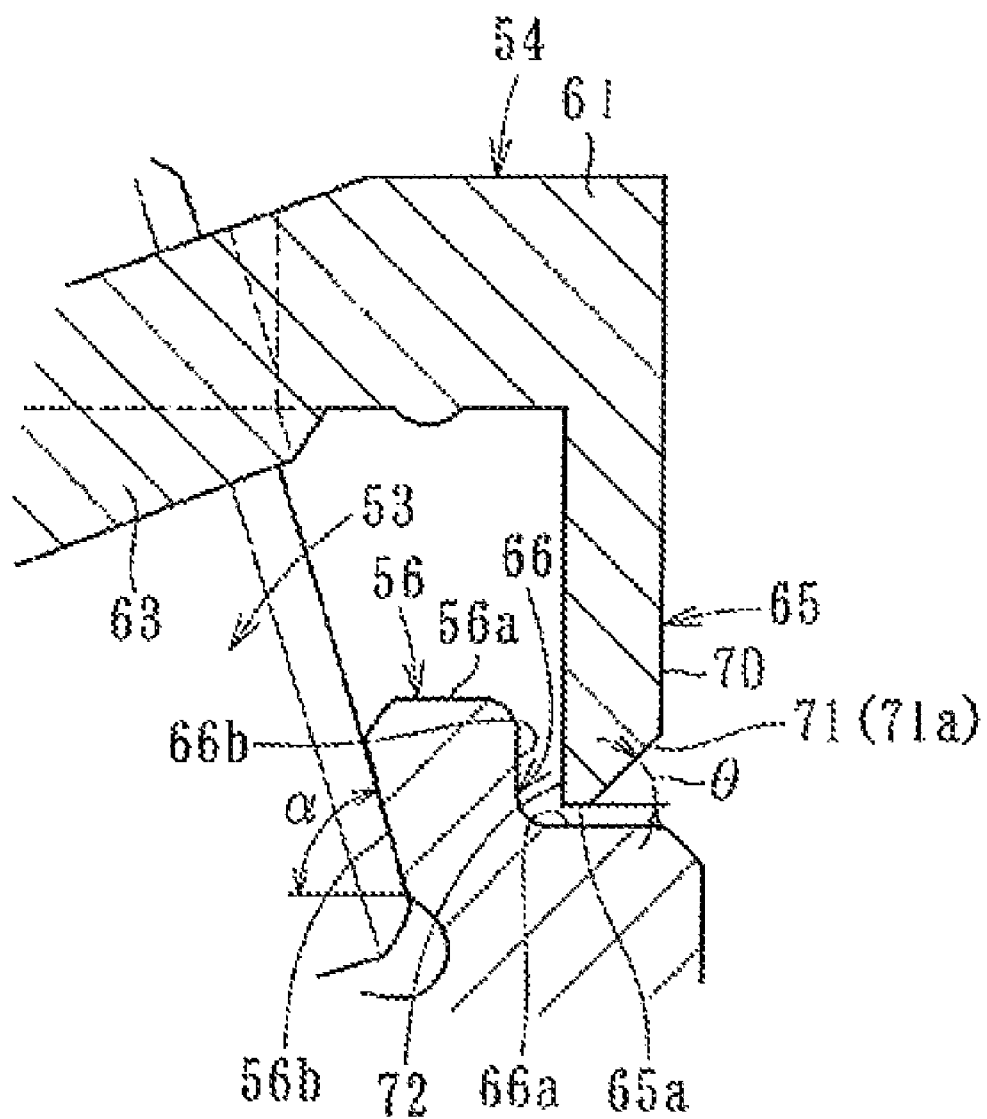
FIG. 2 is an enlarged view of a main part of the taper roller bearing.

FIG. 1 illustrates a taper roller bearing according to the present invention. The taper roller bearing is a double-row taper roller bearing, which includes a pair of inner races 51A and 51B, an outer race 52, a plurality of taper rollers 53 arranged so as to be rollable between the inner races 51A and 51B and the outer race 52, and a pair of retainers 54A and 54B for retaining the taper rollers 53 at predetermined circumferential intervals.

Each of the inner races 51A and 51B has a tapered raceway surface 55 formed on a radially outer surface thereof, and a flange portion 56 protruding toward a radially outer side is formed on a radially larger side of the raceway surface 55. That is, the raceway surface 55 is formed from the flange portion 56 to a radially smaller end, and hence the flange portion is not formed on the radially smaller side unlike an inner race of a conventional taper roller bearing. A grooved portion 57 is formed in a corner portion between the raceway surface 55 and the flange portion 56. Further, an inner surface (that is, end surface on the radially smaller side) 56b of the flange portion 56 is inclined with respect to a plane orthogonal to a bearing axial center P at a predetermined angle $\alpha$ (refer to FIG. 2).

The flange portion 56 serves as a large flange for supporting a larger end surface 53a of each of the taper rollers 53 on an inner surface 56b thereof, and for bearing axial load applied through an intermediation of each of the taper rollers 53, to thereby guide the rolling of the taper rollers 53. Note that, a small flange provided in conventional taper roller bearings does not play a special role during the rotation of the bearing. In this context, such a component is omitted in the present invention.

The outer race 52 has a pair of tapered raceway surfaces 60 and 60 on a radially inner surface thereof. The plurality of taper rollers 53 retained by the retainers 54 roll between the raceway surfaces 60 and the raceway surfaces 55 of the inner races 51.

In the taper roller bearing, the taper rollers 53 and the respective raceway surfaces 55 and 60 of the inner races 51 and the outer race 52 are held in linear contact with each other, and the taper roller bearing is designed such that the respective raceway surfaces 55 and 60 of the inner and outer races and a roller center O accord with one point (not shown) on the axial center P.

Further, each of the retainers 54 includes a radially-larger-side annular portion 61, a radially-smaller-side annular portion 62, and brace portions 63 for coupling the radially-larger-side annular portion 61 and the radially-smaller-side annular portion 62 with each other. The brace portions 63 are arranged at equal pitches in a circumferential direction, and the taper rollers 53 are accommodated so as to be rollable in accommodating portions (pockets) 64 provided between the brace portions 63 adjacent to each other in the circumferential direction.

On an outer surface of the radially-larger-side annular portion 61, a plurality of flat plate hook portions 65 having a rectangular flat-plate shape and protruding in a radially inner direction are arranged at predetermined pitches in the circumferential direction. The hook portions 65 are engaged with the flange portion 56 of each of the inner races 51. That is, a cutout portion 66 is formed on a radially larger side of a radially outer surface 56a of the flange portion 56 of each of the inner races 51, and the hook portions 65 are engaged with the cutout portion 66. In this case, between the hook portions 65 and the cutout portions 66, there are slight gaps in an axial direction and a radial direction, which allow the retainers 54 to slightly move in the axial direction and the radial direction. That is, the hook portions 65 are kept out of contact with the flange portion 56 of each of the inner races 51 when the retainers 54 are in a neutral state with respect to the axial center during operation (in a bearing-assembled state), and the hook portions 65 are brought into contact with the flange portion 56 when a bottom surface 66a of the flange portion 56 of each of the inner races 51 and an inner surface (radially inner end) 65a of each of the hook portions 65 are brought into contact with each other. The hook portions 65 effect hooking so that the inner races 51, the taper rollers 53, and the retainers 54 are maintained in the assembled state also at the time except during operation. Thus, a cutout dimension of the cutout portion 66 is set in accordance with a relative approaching amount to be tolerated between the radially inner end 65a of each of the hook portions 65 and the bottom surface 66a of the cutout portion 66 and with a mutual approaching amount to be tolerated between an inner surface 72 of each of the hook portions 65 and a radial cutout surface 66b of the cutout portion 66.

Further, on a radially inner end portion of an outer surface (outer end surface) 70 of each of the hook portions 65, there is formed a guide surface portion 71 for guiding each of the inner races 51 to be incorporated. The guide surface portion 71 is a taper surface 71a reduced in diameter to the axially inner side, and an inclination angle thereof is set approximately to 45°, for example.

An aperture pressing-angle (aperture angle) e (refer to FIG. 4) formed between brace surfaces 63c of the brace portions 63 adjacent to each other is set to 55° or larger and 80° or smaller, for example.

A roller coefficient γ is set to be larger than 0.94. In this case, the roller coefficient γ is defined by the following formula. Further, the aperture angle θ of the pocket (formed between the brace portions adjacent to each other in the circumferential direction) represents an angle formed between surfaces of the brace portions 63, which are brought into contact with a rolling surface of each of the taper rollers 53.

Roller coefficient $\gamma = (Z \cdot DA)/(\pi \cdot PCD)$ where Z is the number of the rollers, DA is an average diameter of the rollers, and PCD is a pitch circle diameter of the rollers.

Incidentally, the retainers 54 may be made of iron plate or resin. In the case of an iron plate, it is possible to increase rigidity of the retainers so as to stably retain the taper rollers 53 over a long period of time. In addition, the retainers are excellent in oil resistance so that material deterioration caused by exposure to oil is prevented.

In the case of a resin, preferred examples of a synthetic resin material include engineering plastics. The retainers made of iron plate are advantageous in being capable of use without concern for oil resistance (material deterioration caused by exposure to oil). Further, in the case of a resin, specifically, engineering plastics, the retainers made of a resin do not involve operations such as bottom-widening or caulking in bearing assembly. Therefore, desired dimensional accuracy is easily secured. Further, in comparison with ones made of iron plate, the retainers made of a resin have the following features: lighterweight, self-lubricancy, and lower frictional coefficient. Thus, synergistically with the effect of a lubricating oil existing in the bearing, it is possible to suppress generation of abrasion due to contact with the outer race. Further, the retainers made of a resin are lighterweight and have lower frictional coefficient, and hence is suitable for suppressing torque loss and abrasion of the retainers at the time of activating the bearing. Note that, the engineering plastics represent a synthetic resin which is especially excellent in thermal resistance and which can be used in the fields where high strength is required. A resin further excellent in thermal resistance and strength is referred to as super engineering plastics, and the super engineering plastics may be used.

Examples of the engineering plastics include polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE). Further, examples of the super engineering plastics include polysulfone (PSF), polyether sulfone (PES), polyphenylene sulfide (PPS), polyarylate (PAR), polyamideimide (PAI), polyetherimide (PEI), polyetheretherketone (PEEK), liquid crystal polymer (LCP), thermoplastic polyimide (TPI), polybenzimidazole (PBI), polymethylpentene (TPX), poly(1,4-cyclohexanedimethylene terephthalate) (PCT), polyamide 46 (PA46), polyamide 6T (PA6T), polyamide 9T (PA9T), polyamide 11, 12 (PA11, 12), fluororesins, and polyphthalamide (PPA).

Particularly preferred is a polyphenylene sulfide resin (PPS). PPS is a high-performance engineering plastic having a molecular structure in which a phenyl group (benzene ring) and sulfur (S) are alternately repeated. PPS is crystalline and is excellent in heat resistance, for example, has a continuous use temperature of 200° C. to 220° C. and has a deflection temperature under load in a high load (1.82 MPa) condition of 260° C. or higher. In addition, PPS has high tensile strength and flexural strength. PPS has a mold shrinkage factor as small as 0.3 to 0.5%, and hence has good dimensional stability. PPS is also excellent in flame retardance and chemical resistance. PPS is broadly classified into three types: a crosslinked type; a linear type; and a semi-crosslinked type. The crosslinked type is a high molecular weight product obtained by crosslinking a low molecular weight polymer and is brittle, and thus, the main grade is a grade reinforced with a glass fiber. The linear type is a high molecular weight product obtained without any cross-linking process at a polymerization stage, and has high toughness. The semi-crosslinked type is characterized by having both properties of the crosslinked type and the linear type.

Next, description is made on an assembly method of the taper roller bearing. First, the taper rollers 53 are accommodated in the pockets 64 of the retainers 54, respectively. After that, the inner races 51 are fitted to an inside of an assembly thus obtained of the retainers 54 and the taper rollers 53. In other words, the assembly of the retainers 54 and the taper rollers 53 is fitted to an outside of the inner races 51.

Figure 3A:
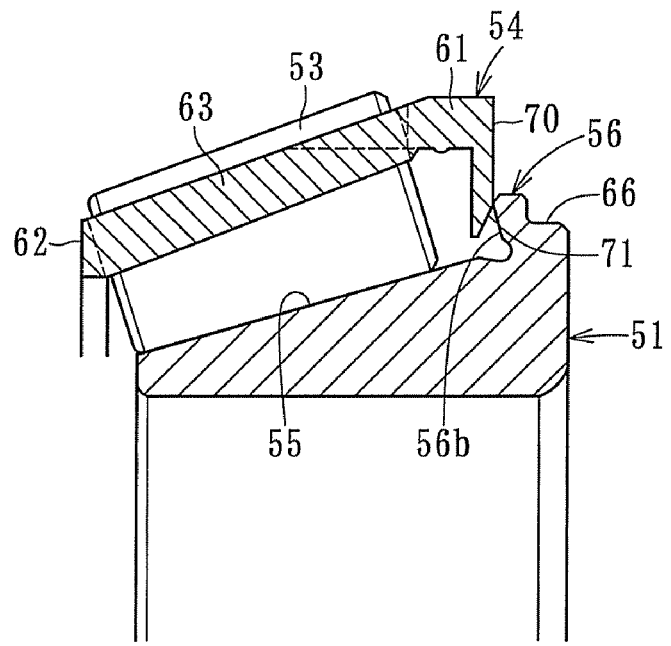
FIG. 3A is a sectional view illustrating how to assemble the taper roller bearing and a state in which a radially outer end of an inner surface of a flange portion is held in contact with a radially outer end of a guide surface portion.
Figure 3B:
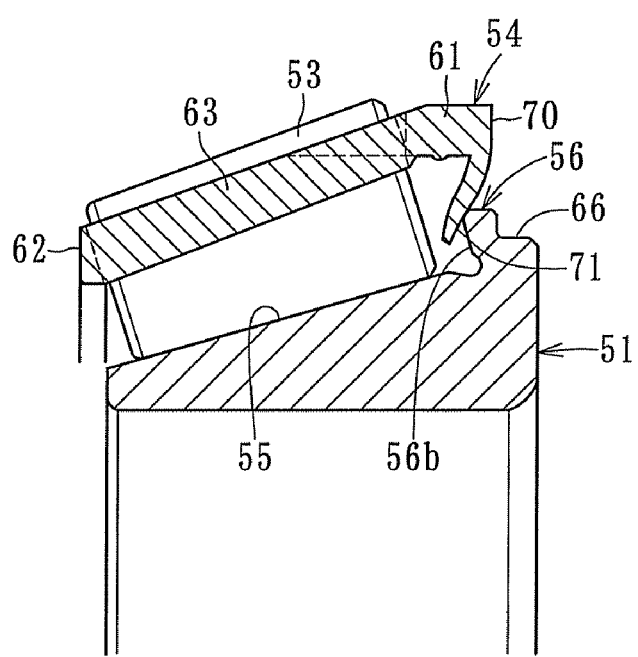
FIG. 3B is a sectional view illustrating how to assemble the taper roller bearing and a state in which the inner surface of the flange portion of the inner race slides on the guide surface portion.
Figure 4:
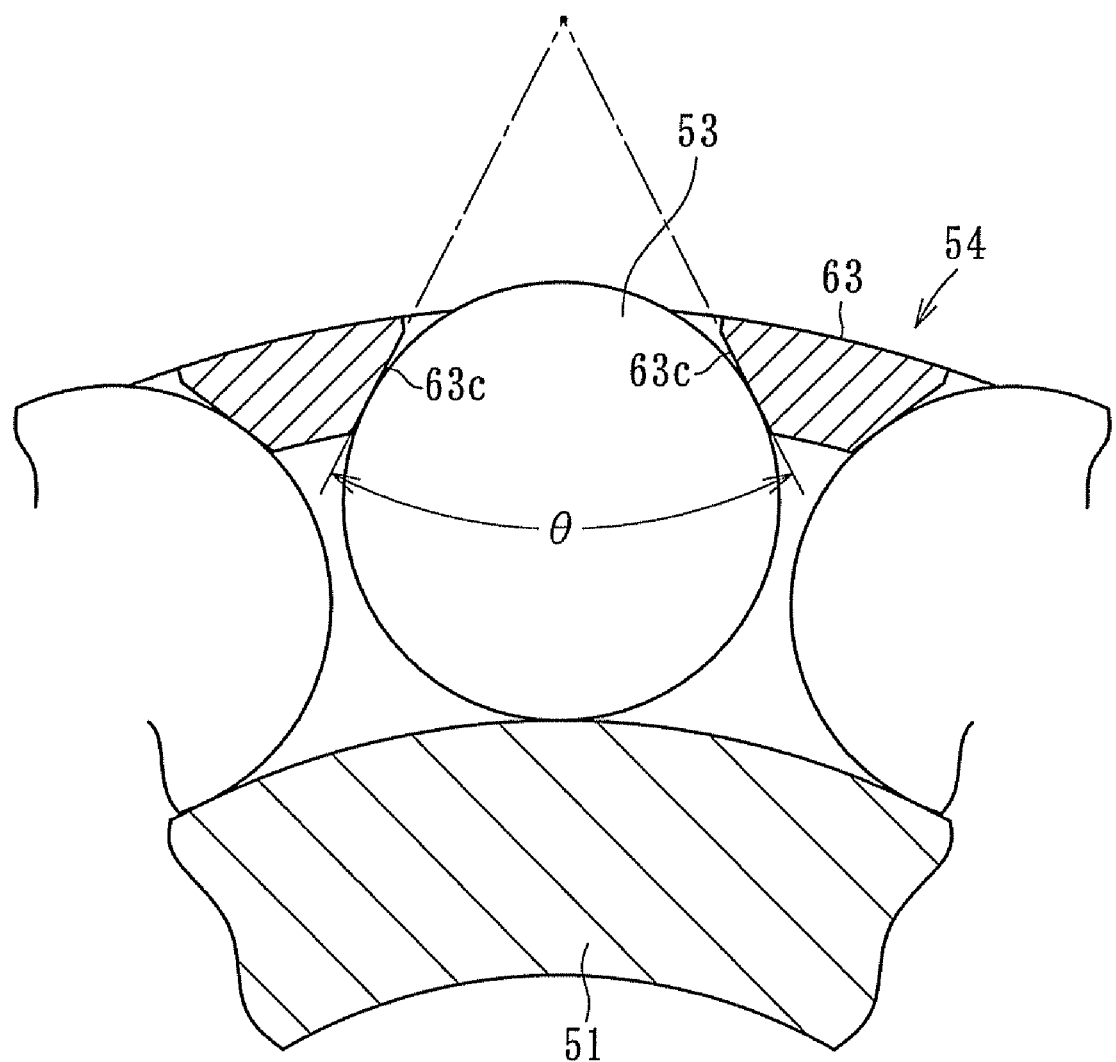
FIG. 4 is an enlarged sectional view of the main part of the taper roller bearing.

That is, as illustrated in FIG. 3A, when the inner races 51 are inserted into the assembly of the retainers 54 and the taper rollers 53, first, a radially outer end of the inner surface 56b of the flange portion 56 is brought into contact with a radially outer end of the guide surface portion 71. In this state, when the inner races are further inserted with respect to the retainers 54, the inner surface 56b of the flange portion 56 of each of the inner races 51 slides on the guide surface portion 71 as illustrated in FIG. 3B, and with this, each of the hook portions 65 is elastically deformed so as to climb over the flange portion 56. Then, after climbing over the flange portion 56, each of the hook portions 65 restores to an original state, with the result that the flange portion 56 is arranged between the rollers 53 and the hook portions 65.

After that, a pair of assemblies each including one of the inner races 51, the taper rollers 53, and one of the retainers 54 are formed, and the assemblies are inserted from both opening portions onto the outer race 52, respectively. In this manner, it is possible to assemble the taper roller bearing constituted by the inner races 51, the taper rollers 53, the retainers 54, and the outer race 52 integrated with each other. In this case, radially smaller side end surfaces 68 and 68 of the inner races 51 and 51 are abutted against each other, and an axial outer end portion of each of the retainers 54 (that is, outer surface 70 of hook portions 66) are prevented from protruding in the axial direction to an outer side with respect to radially larger side end surfaces 69 and 69 of the inner races 51 and 51.

In the taper roller bearing of the present invention, the flange portion on the radially smaller side of the inner race, which exists in the conventional taper roller bearings, is omitted. Thus, it is possible to achieve weight reduction correspondingly to weight of the flange portion thus omitted. In addition, the raceway surface is widened correspondingly to the sizes of the flange portion and the grooved portion on the radially smaller side thus omitted. With this, it is possible to increase the length of the axial center of the taper rollers, and hence to increase the load capacity thereof. As a result, it is possible to achieve longer life of the taper roller bearing.

The hook portions 65 stably prevent the rollers 53 from being detached from the inner races 51. With this, it is possible to enhance incorporating properties. Specifically, each of the inner races 51 can be incorporated while being guided along the guide surface portion 71, and hence excessive external force is prevented from acting on the hook portions 65 at the time of the incorporation. Thus, it is possible to prevent occurrences of damage to the hook portions 65 and plastic deformation exceeding the elastic limit, and hence possible to stably perform the function of the hook portions 65.

The guide surface portion 71 constitutes the taper surface 71a reduced in diameter to the axially inner side, and the guide surface portion can be stably formed. With this, it is possible to increase reliability in incorporation into the inner races 51.

Figure 10:
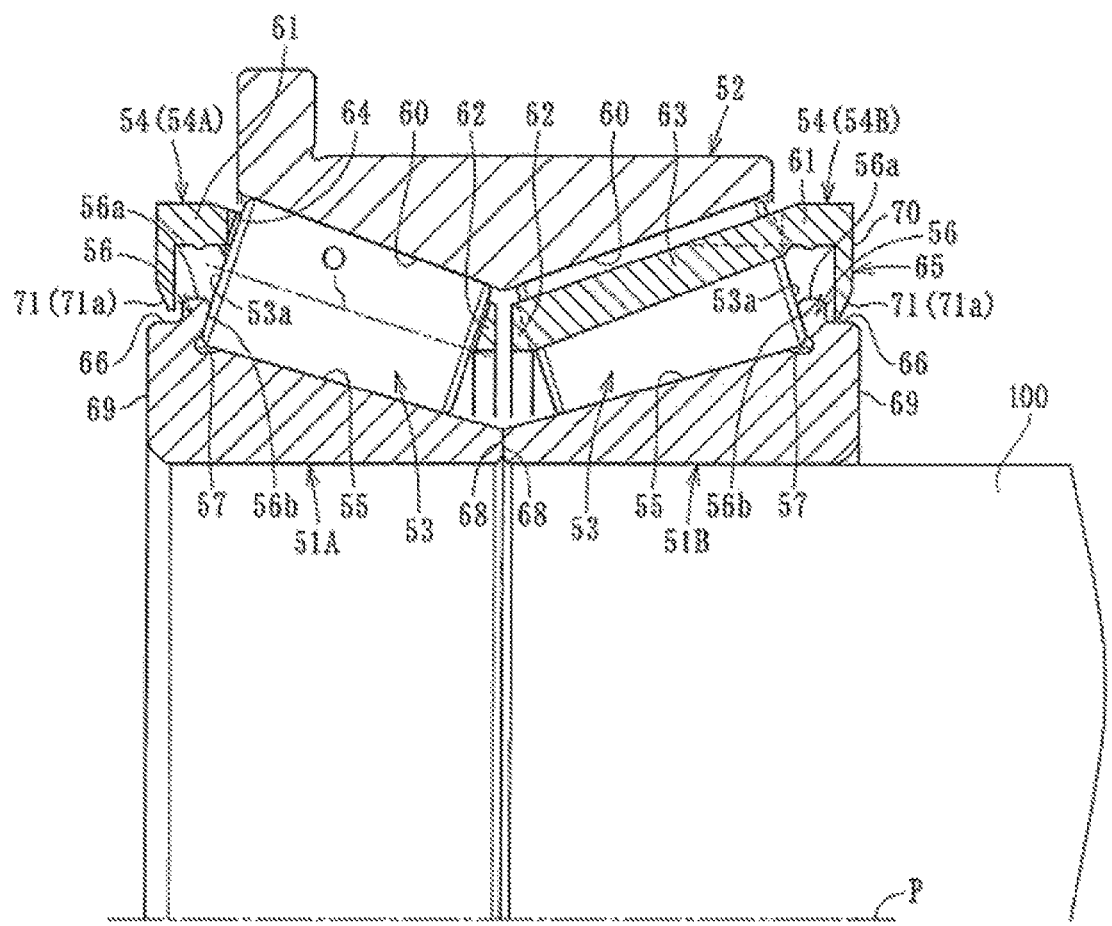
FIG. 10 is a sectional view of the tapered roller bearing schematically illustrated as supporting a power transmission shaft of an automobile.

As described above and illustrated in FIG. 10, the taper roller bearing of the present invention is optimum as a bearing for supporting a power transmission shaft 100 of an automotive vehicle.

Figure 5A:
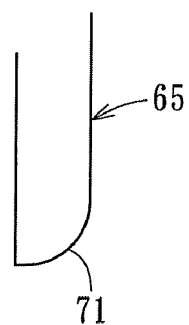
FIG. 5A is a sectional view of a case where the guide surface portion exhibits a convex round shape.
Figure 5B:
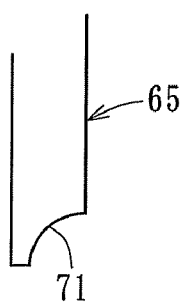
FIG. 5B is a sectional view of a case where the guide surface portion exhibits a concave round shape.
Figure 5C:
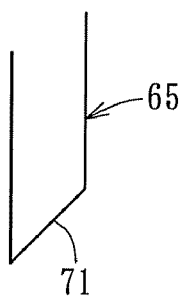
FIG. 5C is a sectional view of a case where the guide surface portion exhibits a taper shape.
Figure 6:
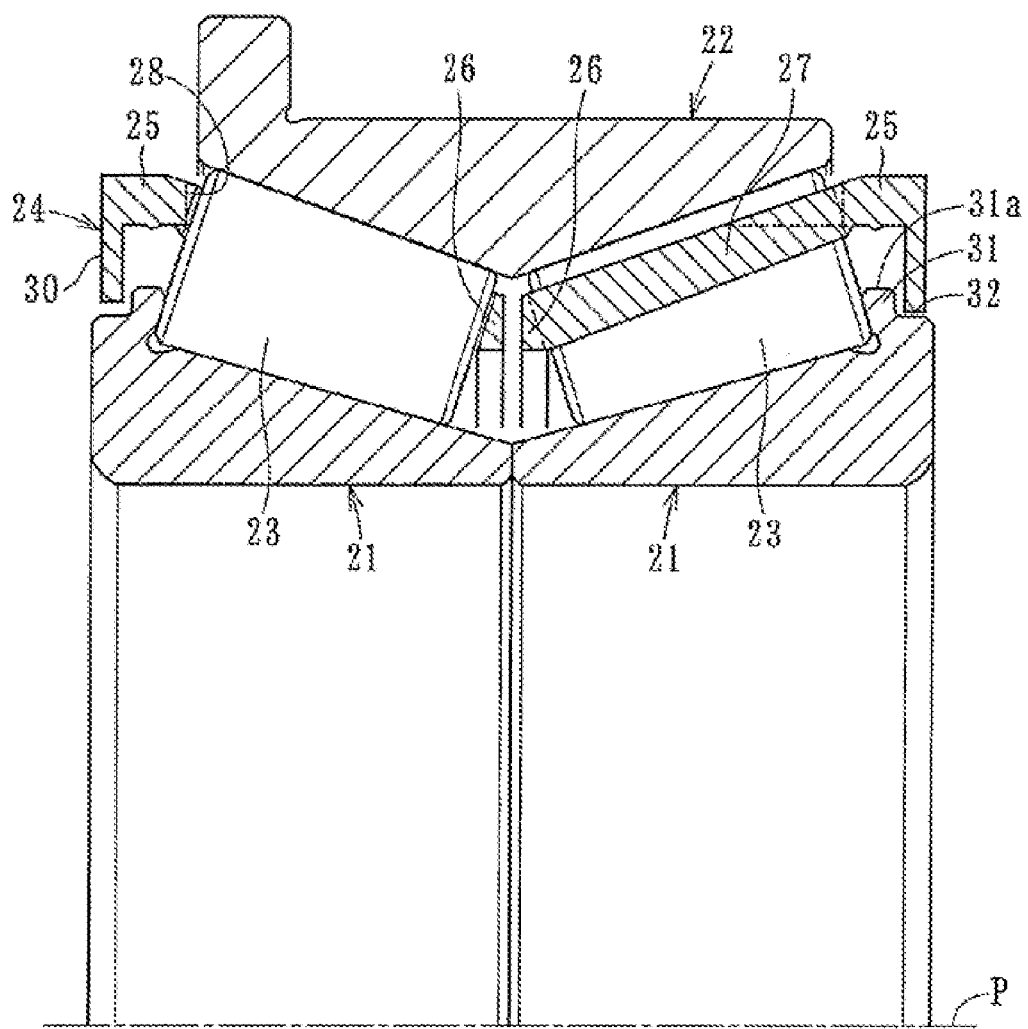
FIG. 6 is a sectional view of a conventional taper roller bearing.
Figure 7:
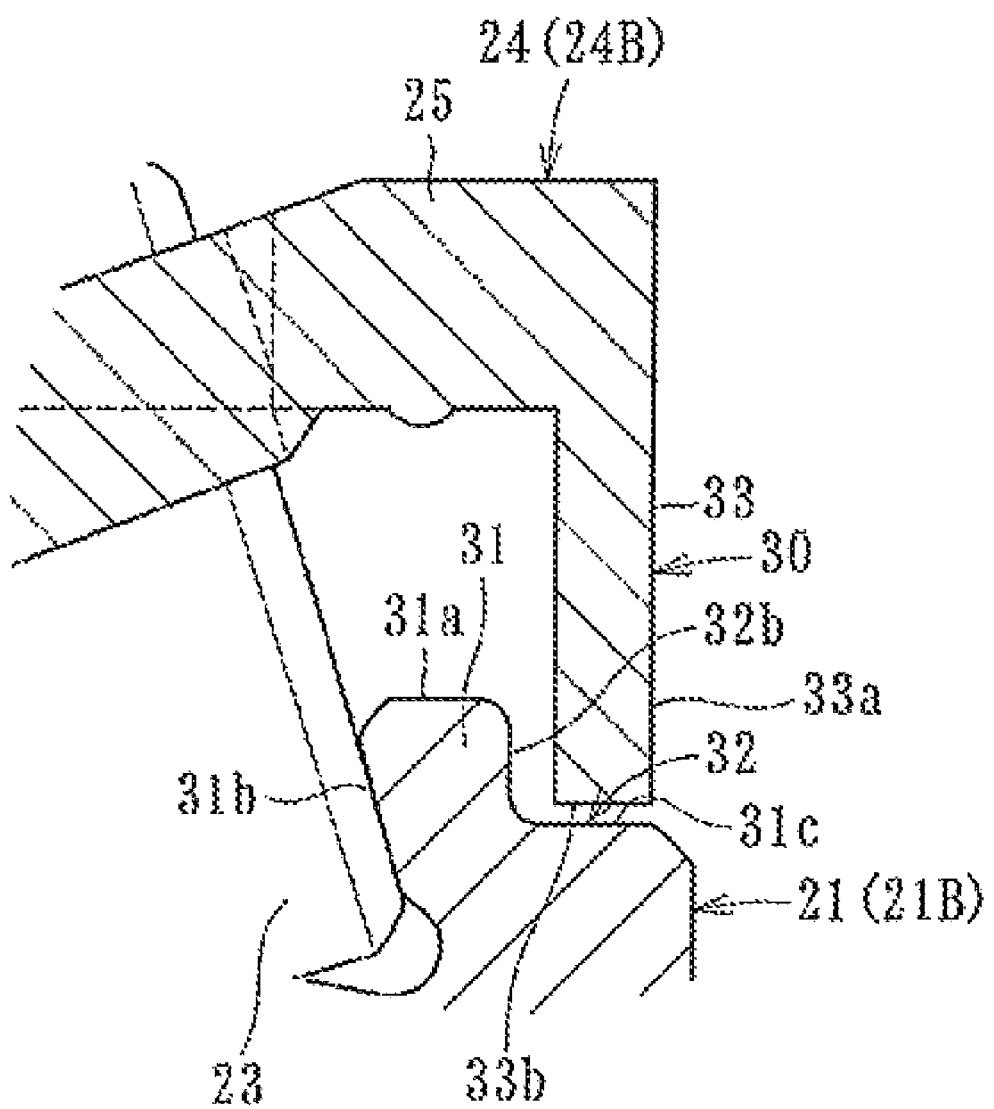
FIG. 7 is a sectional view of a retainer of the conventional taper roller bearing.
Figure 8:
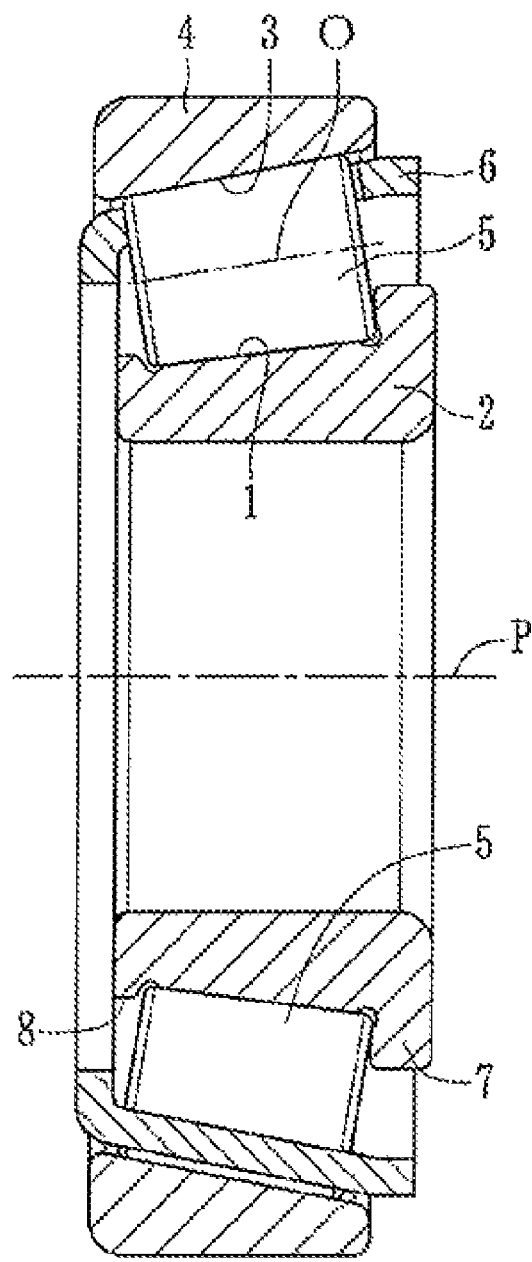
FIG. 8 is a sectional view of another conventional taper roller bearing.
Figure 9:
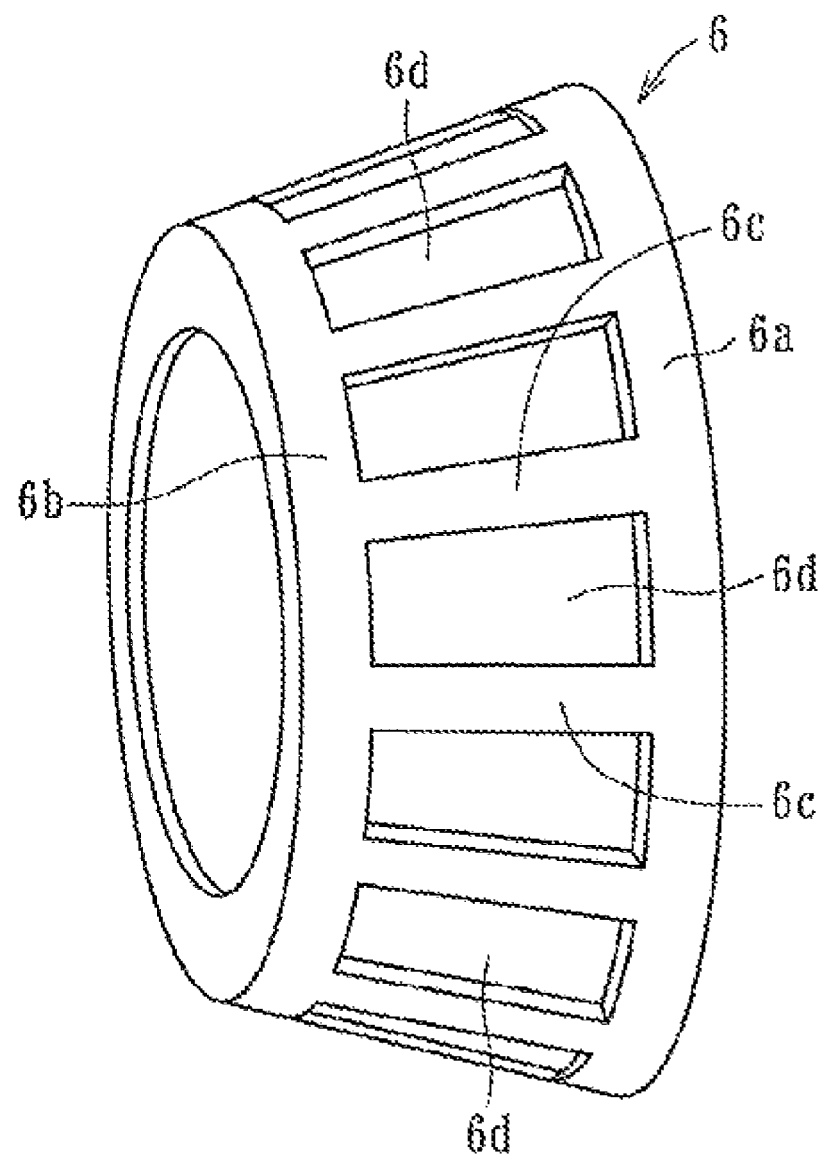
FIG. 9 is a perspective view of a retainer of the taper roller bearing illustrated in FIG. 8.

Incidentally, the guide surface portion 71 may be formed as illustrated in FIGS. 5A, 5B, and 5C. That is, FIG. 5A illustrates a convex round shape, and FIG. 5B illustrates a concave round shape. Further, as described above in this embodiment, the radially inner end 65a of each of the hook portions 65 is formed as a flat portion. FIG. 5C does not illustrate the flat portion. Note that, curvature radii of the convex round shape and the concave round shape may be variously set as long as the inner races 51 can be guided to be incorporated.

Even with the guide surface portions 71 illustrated in FIG. 5A, 5B, or 5C, it is possible to guide the inner races 51 to be incorporated. Thus, even when the retainers 54 as described above are used, it is possible to achieve the same actions and effects as those of the taper roller bearing illustrated in FIG. 1.

Hereinabove, description has been made on the embodiment of the present invention. In this context, the present invention is not limited to the above-mentioned embodiment, and various modifications may be made thereto. For example, while the number of the hook portions 65 may be arbitrarily increased and decreased, at least one hooking portion is sufficient for stably preventing the taper rollers 53 from falling off. In consideration of strength and incorporating properties, it is preferred to arrange four to eight hooking portions at equal pitches in the circumferential direction. Further, the hook portions 65 may be constituted by ring portions. In this embodiment, the cutout portion 66 is formed on the radially larger side end surface 69 of each of the inner races 51. Instead of being formed on the radially larger side end surface 69, the cutout portion 66 may be constituted by an annular recessed groove formed in the radially outer surface 56a of the flange portion 56.

Further, in the case of constituting the guide surface portion 71 by the taper surface 71a, the inclination angle thereof is not limited to 45°, and may be variously changed as long as the inner races 51 can be guided to be incorporated.

Note that, the taper roller bearing may include a single-row taper roller bearing.

INDUSTRIAL APPLICABILITY

The present invention may be used for a differential or transmission of an automobile, and may be used for various portions in which the taper roller bearing can be conventionally used.

The invention claimed is:

1. A taper roller bearing, comprising:
an inner race;
an outer race;
a plurality of taper rollers arranged so as to be rollable between the inner race and the outer race; and
a retainer for retaining the taper rollers at predetermined circumferential intervals,
wherein the inner race includes a flange portion provided only on a radially larger side of a radially outer surface of the inner race, for guiding the taper rollers,
wherein the retainer comprises:
a radially-larger-side annular portion having a hook portion capable of being hooked to the flange portion of the inner race;
a radially-smaller-side annular portion; and
a brace portion coupling the radially-larger-side annular portion and the radially-smaller-side annular portion with each other, wherein the hook portion has a flat-plate shape, has a flat surface at a radially-larger-side thereof, and has, at a radially inner end portion, a guide surface portion for guiding the inner race, and wherein the guide surface portion is a tapered surface such that a thickness of the radially inner end portion is reduced towards an axial inner side.

2. A taper roller bearing according to claim 1, wherein:

the hook portion effects hooking with respect to the flange portion of the inner race so that the inner race, the taper rollers, and the retainer are maintained in an assembled state, the hook portion being kept out of contact with the flange portion when the retainer is in a neutral state with respect to an axial center of the taper roller bearing;

the flange portion has a cutout portion; and during operation of the taper roller bearing, the hook portion is (i) kept out of contact with the flange portion, or (ii) brought into contact with the flange portion so that an inner surface of the hook portion and a bottom surface of the cutout portion of the flange portion contact each other.

3. A taper roller bearing according to claim 2, wherein the taper roller bearing has a roller coefficient $\gamma$ that exceeds 0.94.

4. A taper roller bearing according to claim 2, wherein the retainer has a plurality of pockets in which the taper rollers are located, and an aperture angle formed in each of the pockets of the retainer is set to 55° or larger and 80° or smaller.

5. A taper roller bearing according to claim 2, which supports a power transmission shaft of an automotive vehicle.

6. A taper roller bearing according to claim 1, wherein the retainer is made of metal.

7. A taper roller bearing according to claim 6, wherein the taper roller bearing has a roller coefficient $\gamma$ that exceeds 0.94.

8. A taper roller bearing according to claim 6, wherein the retainer has a plurality of pockets in which the taper rollers are located, and an aperture angle formed in each of the pockets of the retainer is set to 55° or larger and 80° or smaller.

9. A taper roller bearing according to claim 1, wherein the retainer is made of a resin.

10. A taper roller bearing according to claim 9, wherein the resin used for forming the retainer comprises a polyphenylene sulfide resin (PPS).

11. A taper roller bearing according to claim 10, wherein the taper roller bearing has a roller coefficient $\gamma$ that exceeds 0.94.

12. A taper roller bearing according to claim 10, wherein the retainer has a plurality of pockets in which the taper rollers are located, and an aperture angle formed in each of the pockets of the retainer is set to 55° or larger and 80° or smaller.

13. A taper roller bearing according to claim 9, wherein the taper roller bearing has a roller coefficient $\gamma$ that exceeds 0.94.

14. A taper roller bearing according to claim 9, wherein the retainer has a plurality of pockets in which the taper rollers are located, and an aperture angle formed in each of the pockets of the retainer is set to 55° or larger and 80° or smaller.

15. A taper roller bearing according to claim 1, wherein the taper roller bearing has a roller coefficient $\gamma$ that exceeds 0.94.

16. A taper roller bearing according to claim 1, wherein the retainer has a plurality of pockets in which the taper rollers are located, and an aperture angle formed in each of the pockets of the retainer is set to 55° or larger and 80° or smaller.

17. A taper roller bearing according to claim 1, which supports a power transmission shaft of an automotive vehicle.

\* \* \* \* \*